US012729261B2

(12) United States Patent
Yan et al.

(10) Patent No.: US 12,729,261 B2
(45) Date of Patent: Sep. 8, 2026

(54) CROSS-LINKABLE POLYMER COMPOSITIONS AND APPLICATIONS THEREOF

(71) Applicant: Notark Corporation, Houston, TX (US)

(72) Inventors: Jiaqi Yan, Houston, TX (US); Manjola Plaku, Houston, TX (US)

(73) Assignee: Notark Corporation, Houston, TX (US)

( * ) Notice: Subject to any disclaimer, the term of this patent is extended or adjusted under 35 U.S.C. 154(b) by 537 days.

(21) Appl. No.: 18/366,043

(22) Filed: Aug. 7, 2023

(65) Prior Publication Data

US 2024/0052083 A1 Feb. 15, 2024

Related U.S. Application Data

(60) Provisional application No. 63/370,797, filed on Aug. 9, 2022, provisional application No. 63/502,131, filed on May 15, 2023.

(51) Int. Cl.

| | |
|---|---|
| ***C08F 293/00*** | (2006.01) |
| ***B01D 69/02*** | (2006.01) |
| ***B01D 71/26*** | (2006.01) |
| ***B01D 71/28*** | (2006.01) |
| ***B01D 71/80*** | (2006.01) |
| ***C08J 5/22*** | (2006.01) |

(52) U.S. Cl.

CPC ............ *C08F 293/00* (2013.01); *B01D 69/02* (2013.01); *B01D 71/261* (2022.08); *B01D 71/262* (2022.08); *B01D 71/281* (2022.08); *B01D 71/80* (2013.01); *C08J 5/2243* (2013.01); *B01D 2325/20* (2013.01); *B01D 2325/24* (2013.01); *C08J 2353/00* (2013.01)

(58) Field of Classification Search

CPC .......... C08F 293/00; C08F 8/34; C08L 71/02; C08L 53/025; B01D 71/80; B01D 2325/24

See application file for complete search history.

(56) References Cited

U.S. PATENT DOCUMENTS 5,516,831 A * 5/1996 Pottick .................. C08L 53/025 524/529

2011/0086982 A1 4/2011 Willis

* cited by examiner

*Primary Examiner* — Fred M Teskin

(57) ABSTRACT

The disclosure relates to a cured composition obtained by curing a curable polymer composition comprising: (a) at least one hydroxyl group containing compound selected from diols, triols, tetraols, polyols, polymeric polyols, and mixtures thereof; and (b) a sulfonated styrenic block copolymer (SSBC) containing a block A, a block B, and a block D. Each block A and D is resistant to sulfonation and the block B is susceptible to sulfonation having a degree of sulfonation of >10 mole %. The curable polymer composition is cured by treating with radiation or thermal energy for improved mechanical properties. The cured composition can be used as a membrane in water purification applications.

19 Claims, No Drawings

CROSS-LINKABLE POLYMER COMPOSITIONS AND APPLICATIONS THEREOF

RELATED APPLICATIONS

This application claims benefit to U.S. provisional application No. 63/370,797, filed on Aug. 9, 2022, and U.S. provisional application No. 63/502,131, filed on May 15, 2023, which are hereby incorporated herein by reference.

FIELD

The present disclosure relates to cured compositions, methods of preparation, and applications thereof.

BACKGROUND

Water purification membranes have been widely used to remove contaminants and other particulates for obtaining pure water. The purification of contaminated/waste water is essential due to, e.g., severe water shortages and droughts, depletion of freshwater resources, stricter environmental regulation, etc. Materials used in the preparation of membranes play a crucial role in the purification of water and to enhance durability of a purification system.

Sulfonated block copolymers have been used in the preparation of membranes for a number of applications, e.g., batteries, fuel cells, and even as antimicrobial protective layers. Modification of sulfonated block copolymers or their blends with other compounds/polymers can help improve properties of such polymers.

There is still a need for cured compositions containing sulfonated block copolymers with improved mechanical properties, such as, swelling and water vapor transmission rate (WVTR).

SUMMARY

In one aspect, the disclosure relates to a cured composition obtained by curing a curable polymer composition comprising, consisting essentially of, or consists of: (a) 3 to 50 wt. % of at least one hydroxyl group containing compound and (b) 50 to 97 wt. % of a sulfonated styrenic block copolymer (SSBC). The hydroxyl group containing compound is selected from the group consisting of diols, triols, tetraols, polyols, polymeric polyols, and mixtures thereof. Each of diols, triols, tetraols, and polyols independently has a molar mass of less than 0.5 kg/mol. The SSBC comprises a block A, a block B, and a block D. Each block A is a polymer block resistant to sulfonation and selected from polymerized (i) para-substituted styrene monomers, (ii) ethylene, (iii) alpha olefins of 3 to 18 carbon atoms, (iv) 1,3-cyclodiene monomers, (v) monomers of conjugated dienes having a vinyl content less than 35 mole % prior to hydrogenation, (vi) acrylic esters, (vii) methacrylic esters, and (viii) mixtures thereof, each block B is a polymer block susceptible to sulfonation and derived from a vinyl aromatic monomer, and each block D is a polymer block resistant to sulfonation and derived from a conjugated diene monomer. The block B has a degree of sulfonation of >10 mole %. The cured composition is characterized as having a tensile stress per ASTM D412 of: 6.2 to 30 MPa in a dry state, and 3 to 10 MPa in a wet state after 1 day, both measured as described in the specification. The cured composition has a Gel Content of >70%, measured according to Gel Content Test as described in the specification.

In a second aspect, the hydroxyl group containing compound is a polymeric polyol having a weight average molecular weight (M w) of 0.5 to 30 kg/mol and selected from the group consisting of polyether polyol, polyester polyol, polyester-polyether polyol, polycarbonate polyol, polycaprolactone polyol, acrylic polyol, polyether polycarbonate polyol, and mixtures thereof.

In a third aspect, the hydroxyl group containing compound is a polymeric polyol having a weight average molecular weight (M w) of 0.7 to 22 kg/mol.

In a fourth aspect, the hydroxyl group containing compound is a polyether polyol.

DESCRIPTION

The following terms will be used throughout the specification.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. A list of embodiments presented as "A, B, or C" is to be interpreted as including the embodiments, A only, B only, C only, "A or B," "A or C," "B or C," or "A, B, or C".

"Polystyrene content" or PSC of a block copolymer refers to the weight % of the polymerized vinyl aromatic monomer, e.g., styrene in the block copolymer, calculated by dividing the sum of molecular weights of all polymerized vinyl aromatic units by the total molecular weight of the block copolymer. PSC can be determined using any suitable methodology such as proton nuclear magnetic resonance (NMR).

"Molecular weight" or $M_w$ refers to the polystyrene equivalent molecular weight in kg/mol or g/mol of a polymer block or a block copolymer. $M_w$ can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC so calibrated are polystyrene equivalent molecular weights or apparent molecular weights. $M_w$ expressed herein is measured at the peak of the GPC trace and are commonly referred to as polystyrene equivalent "peak molecular weight," designated as $M_p$.

"Curing" refers to a process that produces a material by cross-linking or forming new bonds and/or modifying existing bonds of monomers, oligomers, polymers, or mixtures thereof, by any of thermal, radiation, or chemical means. Also, "cured" refers to a polymer that has undergone a curing/cross-linking process.

"Cross-linkable" is used interchangeably with "curable" as used herein refers to a composition that can be cured and used.

"Diol", "triol", "tetrol", or "polyol" refer to compounds having 2, 3, 4, or more hydroxyl groups and each independently has a molar mass of <0.5 kg/mol. Here, "molar mass" refers to a molecular weight or total mass of a compound which is equal to sum of the individual atomic masses of each atom in a molecule.

"Polymeric polyol" refers compounds having long-chain with polymeric structure and containing at least two hydroxyl groups, either at terminal positions or as pendant to backbone. In embodiments, the polymeric polyol has a weight average molecular weight (M w) of 0.5 to 30 kg/mol.

"Sulfonated styrenic block copolymer" or "SSBC" refers to a styrenic block copolymer which contains sulfonic acid and/or sulfonate ester groups.

"Membrane" or "film" refers to a continuous, pliable sheet or layer of a material, is a selective barrier which allows something, e.g., molecules, ions, gases, or particles, etc., to pass through but stops others.

"Susceptible to sulfonation" refers to a polymer, polymer block, compound, monomer, oligomer, etc., being predisposed, or sensitive, or capable of reaction with sulfur containing compound, e.g., $SO_3$, $H_2SO_4$, etc., under conditions conventionally employed for sulfonation, wherein sulfonation is very likely to occur to obtain a sulfonated product. In embodiments, a polymer block "susceptible to sulfonation" upon sulfonation, the degree of sulfonation is at least 10 mol %, or at least 20 mol %, or at least 30 mol %, or at least 50 mol %, or at least 75 mol %, of the total polymer block, for the polymer block to have at least mol %, or at least 20 mol %, or at least 30 mol %, or at least 50 mol %, or at least 75 mol % sulfonic acid or sulfonate ester functional groups.

"Resistant to sulfonation" means having little if any sulfonation of the respective block under conditions conventionally employed for sulfonation, with <10 mol %, or <8 mol %, or <5 mol % sulfonic acid or sulfonate ester functional groups in the polymer block.

"Ion Exchange Capacity" or IEC refers to the total active sites or functional groups responsible for ion exchange in a polymer. Generally, a conventional acid-base titration method is used to determine the IEC, see for example International Journal of Hydrogen Energy, Volume 39, Issue 10, Mar. 26, 2014, Pages 5054-5062, "Determination of the ion exchange capacity of anion-selective membrane." IEC is the inverse of "equivalent weight" or EW, which is the weight of the polymer required to provide 1 mole of exchangeable protons.

"Dry" or "dry state" refers to or describes the state of hydration of the material or membrane which has absorbed essentially no or only insignificant amounts of water. For example, a material or membrane which is merely in contact with the atmosphere is considered to be in the dry state.

"Wet" or "wet state" refers to or describes the state at which the material or membrane has reached equilibrium with water or has been immersed in water for a period, e.g., >5 minutes, or >1 hour, or >1 day, or >1 week, etc. The properties of the film such as "toughness in wet state" or "tensile stress in wet state" etc., refer to the properties of the film immersed in water for a specified period, and then taken out from water for testing.

"Gel Content" refers to the insoluble contents of a cured composition in toluene:1-propanol (weight ratio of 1:1) as a percentage of the cured composition (prior to immersing in the toluene:1-propanol). In embodiments, the Gel Content is >90% (i.e., the amount of composition dissolved in toluene: 1-propanol is <10%), or >95%, or >98%.

"Gel Content Test" refers to a measurement of a Gel Content by placing a sample of a cured composition having a weight G1 in 20 times volume of toluene:1-propanol (weight ratio of 1:1), for a period of room temperature until an equilibrium is reached, e.g., 4 hours. Content in toluene: 1-propanol is then filtered to recover the solid portion of the cured composition, then dried to remove the solvent, and weighed, giving the insoluble content weight G2. Gel Content is calculated as (G2/G1).

"Weight Gain" refers to a weight difference (W %) of a weight of a cured composition after being immersed in water (W2) for specific time periods, e.g., 1 day, or 1 week, or more, and the weight of the cured composition before immersion (W1), calculated as: W %=(W2−W1)/W1*100. Weight Gain is used interchangeably with Water Uptake.

The present disclosure relates to a cured composition obtained by curing a curable polymer composition comprising: (a) at least a hydroxyl group containing compound selected from diols, triols, tetraols, polyols, polymeric polyols, and mixtures thereof; and (b) a sulfonated styrenic block copolymer (SSBC). The cured composition can be used for forming articles such as films, membranes, etc., with improved mechanical properties in aqueous medium for applications including water purification membranes.

(Sulfonated Styrenic Block Copolymer (SSBC))

The SSBC is obtained by sulfonation of a styrenic block copolymer (SBC) precursor which is any of linear, branched, or radial block copolymer having a block A, a block B, and a block D. In embodiments, at least one block A, B, or D comprises at least one sulfonic acid group, e.g., $—SO_3$, either in an acid form (e.g., $—SO_3H$, sulfonic acid) or a salt form (e.g., $—SO_3Na$). The sulfonate group can be in the form of metal salt, ammonium salt, or amine salt.

In embodiments, the SSBC is characterized as being sufficiently sulfonated, meaning having at least 10 mol % of sulfonic acid or sulfonate ester functional groups based on total mol of the number of monomer units or polymer blocks to be sulfonated ("degree of sulfonation"). In embodiments, the block B has a degree of sulfonation of at least 10 mol %, >15, or >20, or >25, or >30, or >40, or >50, or >60, or >70, or >80, or >90, or >99 mol %. The degree of sulfonation can be calculated by NMR or ion exchange capacity (IEC).

In embodiments, the SBC precursor is prepared by anionic polymerization using techniques known in the art. Other methods, such as cationic polymerization, can also be employed. The anionic polymerization initiator is generally an organometallic compound, such as an organolithium compound, e.g., ethyl-, propyl-, isopropyl-, n-butyl-, sec-butyl-, tert-butyl-, phenyl-, hexylbiphenyl-, hexamethylenedi-, butadieneyl-, isopreneyl-, 1,1-diphenylhexyllithium, or polystyryllithium. An amount of initiator needed is calculated based on the molecular weight to be achieved, generally from 0.002 to 5 wt. %, based on the amount of monomers to be polymerized. Suitable solvents include aliphatic, cycloaliphatic, or aromatic hydrocarbons having from 4 to 12 carbon atoms, such as pentane, hexane, heptane, cyclopentane, cyclohexane, methylcyclohexane, decalin, isooctane, benzene, alkylbenzenes, such as toluene, xylene, or ethylbenzene, or suitable mixtures thereof. Polymer chain termination can be achieved by quenching with a proton donor or a compound having a leaving group that can be displaced by the carbanionic polymer chain.

In embodiments, the SBC precursor has a general configuration of: A-B-A, $(A-B)_n(A)$, $(A-B-A)_n$, $(A-B-A)_nX$, $(A-B)_nX$, A-D-B, A-B-D, A-D-B-D-A, A-B-D-B-A, $(A-D-B)_nA$, $(A-B-D)_nA$ $(A-D-B)_nX$, $(A-B-D)_nX$, $(A-D-B-D-A)_nX$, $(A-B-D-B-A)_nX$ or mixtures thereof; wherein n is an integer from 2 to 30; and X is a residue of a coupling agent. Each block A and D is resistant to sulfonation, and each block B is susceptible to sulfonation.

In embodiments, the coupling agent includes bi- or polyfunctional compounds, for example divinylbenzene, halides of aliphatic or araliphatic hydrocarbons, such as 1,2-dibromoethane, bis(chloromethyl)benzene, or silicon tetrachloride, dialkyl- or diarylsilicon dichloride, alkyl- or arylsilicon trichloride, tin tetrachloride, alkylsilicon methoxides, alkyl silicon ethoxides, polyfunctional aldehydes, such as terephthalic dialdehyde, ketones, esters, anhydrides, or epoxides. In embodiments, the coupling agent is selected from methyltrimethoxysilane (MTMS), methyltriethoxysilane (MTES), tetramethoxysilane (TMOS), dimethyladipate, gamma-glycidoxypropyl-trimethoxy silane, and mixtures thereof.

In embodiments, the block A has at least one compound selected from polymerized (i) para-substituted styrene, (ii) ethylene, (iii) alpha olefins of 3 to 18 carbon atoms; (iv) 1,3-cyclodiene, (v) conjugated dienes having a vinyl content of <35 mol % prior to hydrogenation, (vi) acrylic esters, (vii) methacrylic esters, and (viii) mixtures thereof. If the block A is a polymer of 1,3-cyclodiene or conjugated diene, the block A will be hydrogenated subsequent to preparation of the SBC precursor and before sulfonation of the SBC precursor. In embodiments, the block A contains up to 15 wt. % of vinyl aromatic monomers such as those present in the block B.

In embodiments, the block A comprises polymerized para-substituted styrene monomers selected from the group consisting of para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, and mixtures thereof.

In embodiments, the block A has a $M_p$ of 1-60, or 2-50, or 5-45, or 8-40, or 10-35, or >15, or <50 kg/mol. In embodiments, the block A constitutes from 1-80, or 5-75, or 10-70, or 15-65, or 20-60, or 25-55, or 30-50, or >10, or <75 wt. %, based on total weight of the SSBC.

In embodiments, the block B comprises the polymerized vinyl aromatic monomers selected from the group consisting of unsubstituted styrene, ortho-substituted styrene, meta-substituted styrene, alpha-methylstyrene, 1,1-diphenylethylene, 1,2-diphenylethylene, and mixtures thereof. In embodiments, the block B has a mixture of the vinyl aromatic monomer and hydrogenated conjugated dienes, such as, butadiene or isoprene.

In embodiments, the block B has a $M_p$ of 10-300, or 20-250, or 15-60, or 10-50, or >15, or <100 kg/mol. In embodiments, the block B constitutes from 10-80, or 15-75, or 20-70, or 25-65, or 30-55, or >10, or <75 wt. %, based on total weight of the SBC precursor. In embodiments, the block B has from 0-25, or 2-20, or 5-15 wt. %, of the para-substituted styrene monomers such as those present in the block A.

In embodiments, the block D comprises the polymerized conjugated diene monomer selected from the group consisting of isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene, and mixtures thereof. In embodiments, the block D has a $M_p$ of 1-60, or 2-50, or 5-45, or 8-40, or 10-35, or >1.5, or <50 kg/mol. In embodiments, the block D constitutes from 10-80, or 15-75, or 20-70, or 25-65, >10, or <75 wt. %, based on total weight of the SBC precursor.

In embodiments, prior to hydrogenation and sulfonation, the block D has a vinyl content of >80, or >85, or >90, or >95, or >98, or >99, or >99.5, or 50-95, or 60-90, or 70-95 wt. %, based on total weight of the polymerized conjugated diene monomers in the block D.

In embodiments, the block D has a hydrogenation level of 60-99%, or 65-95%, or 70-90%, or 75-99%, or >75%, or >85%, or >95%, or >98%.

In embodiments, each block A and B independently has a hydrogenation level of 0-20%, or 2-18%, or 4-15%, or >10%, or >15%, or <20%. A suitable catalyst based on nickel, cobalt or titanium can be used in the hydrogenation step.

The SBC precursor is sulfonated to provide the corresponding SSBC. Sulfonation occurs at the phenyl ring of polymerized styrene units in the block B, predominantly para to the phenyl carbon atom bonded to the polymer backbone. In embodiments, the block B has a degree of sulfonation of 10-100, or 15-95, or 20-90, or 25-85, or 30-80, or 35-75, or 40-70, or >15, or <85 mol %, based on total mol of the block B.

In embodiments, the SSBC is a midblock-sulfonated triblock copolymer, or a midblock-sulfonated pentablock copolymer, e.g., a poly(p-tert-butyl styrene-b-styrene-sulfonate-b-p-tert-butyl styrene), or a poly[tert-butylstyrene-b-(ethylene-alt-propylene)-b-(styrenesulfonate)-b-(ethylene-alt-propylene)-b-tert-butylstyrene].

In embodiments, the SSBC has a $M_p$ of 25-500, or 30-450, or 350-400, or 40-350, or 45-300, or 50-250, or >35, or <350 kg/mol.

In embodiments, the SSBC has a glass transition temperature (T g) of 80-180° C., or 85-160° C., or 90-150° C., or 100-140° C., or >90° C., or <210° C., measured by Dynamic Mechanical Analysis (DMA), according to ASTM 4065.

In embodiments, the SSBC has an ion exchange capacity (IEC) of at least 0.5, or >0.75, or >1.0, or >1.5, or >2.0, or >2.5, or 0.5-3.5, or 0.5-2.6, or <5.0 meq/g.

In embodiments, the SSBC used in the curable polymer composition in amounts of 50-97, or 60-95, or 70-95, or 75-97, or 80-95 wt. %, based on total weight of the curable polymer composition.

(Hydroxyl Group Containing Compounds)

The hydroxyl group containing compound is selected from the group consisting of diols, triols, tetrols, polyols, polymeric polyols, and mixtures thereof.

Examples of diols, triols, tetrols, polyols include ethylene glycol, diethylene glycol, dipropylene glycol, triethylene glycol, 1,2-propanediol, tetraethylene glycol, 1,3-propanediol, 1,2-butanediol, 1-3-butanediol, 1,4-butanediol, 1,5-pentanediol, 1,6-hexanediol, 1,8-octanediol, 1,10-decanediol, 1,12-dodecanediol, 1,4-cyclohexanediol, 1,2-diphenol, 1,3-diphenol, 1,4-diphenol, 2-hydroxy-1,3-propanediol, neopentyl glycol, catechol, cyclohexenediol, 1,4-cyclohexanedimethanol, 3-methyl-1,5-pentanediol, 2-methyl-2-ethyl-1,3-propanediol, 2,2-diethyl-1,3-propanediol, 2,2,4-trimethyl-1,3-pentanediol, 1,4-dimethylolcyclohexane, trimethylolpropane, dimethyl-1,2-butanediol, tris(hydroxyethyl)isocyanurate, pentaerythritol, dipentaerythritol, glycerol, diglycerol, triglycerol, ditrimethylolpropane, 3-methyl-1,3-butanediol, 3,3-benzenetriol, 1,2,4-butanetriol, 1,2,6-hexanetriol, tris(methylalcohol)propane, tris(methylalcohol) ethane, tris(methylalcohol)nitropropane, 2,2-bis (methylalcohol)-1,3-propanediol, glycerin monostearate (glyceryl stearate), trihydroxyethylamine, butynediol, hexylene glycol, D-pantothenyl alcohol, panthenol, caprylyl glycol, hydroquinone, 1-thioglycerol, erythorbate, butylated hydroquinone, calix[4]arene, ethylhexylglycerin, caprolactonediol, 1,2,3-propanetriol, hydroxyalkylated bisphenols, 1,2,4-butanetriol, 1,1,4-butanetriol, 1,3,5-pentanetriol, 1,2,5-pentanetriol, 2,3,4-pentanetriol, 1,2,3-hexanetriol, 1,2,6-hexanetriol, 1,3,4-hexanetriol, 1,4,5-hexanetriol, 2,3,4-hexanetriol, 1,2,3-heptanetriol, 1,2,4-heptanetriol, 1,2,6-heptanetriol, 1,3,5-heptanetriol, 1,4,7-heptanetriol, 2,3,4-heptanetriol, 2,4,6-heptanetriol, 1,2,8-octanetriol, 1,3,5-octanetriol, 1,4,7-octanetriol, butane-1,1,1-triol, 2-methyl-1,2,3-propanetriol, 5-methylhexane-1,2,3-triol, 2,6-dimethyl- 3-heptene-2,4,6-triol, benzene-1,3,5-triol, 2-methyl-benzene-1,2,3-triol, 5-methyl-benzene-1,2,3-triol, 2,4,6-trimethylbenzene-1,3,5-triol, naphthalene-1,4,5-triol, 5,6,7,8-tetrahydro naphthalene-1,6,7-triol, 5-hydromethylbenzene-1,2,3-triol, 5-isopropyl-2-methyl-5-cyclohexene-1,2,4-triol, 4-isopropyl-4-cyclohexene-1,2,3-triol, 1,2,3,4-butanetetraol, 1,2,3,4-pentanetetraol, 1,2,4,5-pentanetetraol, 1,2,3,4-hexanetetraol, 1,2,3,5-hexanetetraol, 1,2,3,6-hexanetetraol, 1,2,4,5-hexanetetraol, 1,2,4,6-hexanetetraol, 1,2,5,6-hexanetetraol, 1,3,4,5-hexanetetraol, 1,3,4,6-hexanetetraol, 2,3,4,5-hexanetetraol, 1,2,6,7-heptanetetraol, 2,3,4,5-heptanetetraol, 1,1,1,2-octanetetraol, 1,2,7,8-octanetetraol, 1,2,3,8-octanetetraol, 1,3,5,7-octanetetraol, 2,3,5,7-octanetetraol, 4,5,6,7-octanetetraol, 3,7-dimethyl-3-octene-1,2,6,7-tetraol, 3-hexyne-1,2,5,6-tetraol, 2,5-dimethyl-3-hexyne-1,2,5,6-tetraol, anthracene-1,4,9,10-tetraol, arabitol, maltitol, mannitol, ribitol, sorbitol, xylitol, threitol, galactitol, isomalt, iditol, lactitol sorbitol, and mixtures thereof.

In embodiments, each diol, triol, tetrol, and polyol independently has a molar mass of <0.5, or <0.45, or 0.05-0.5, or 0.05-0.45 or 0.06-0.48, or 0.07-0.45 kg/mol.

Examples of polymeric polyols include polyether polyols, polyester polyols, polyester-polyether polyols, polycarbonate polyols, polycaprolactone polyols, acrylic polyols, polyether polycarbonate polyols, and mixture thereof. In embodiments, the polyether polyol is selected from the group consisting of polyethylene glycol, polypropylene glycol, polybutylene glycol, polytetramethylene glycol, polyethylene glycol ester, polyethylene glycol diester, di-2-ethylhexyl polyethylene glycol ester, polyglycoldiglycidyl ether, polypropylene glycol ester, polyethylene glycol glyceride, polyethylene glycol propionaldehyde, poly(n-vinyl pyrrolidone)polyethylene glycol, poly(ethylene glycol) acrylate, poly(ethylene glycol) methacrylate, poly(ethylene glycol) dimethacrylate, polytetrahydrofuran polyether polyol, and mixtures thereof.

The polyether polyol can be random, or block copolymer obtained from blends or sequential addition of two or more alkylene oxides. In embodiments, the polyether polyol includes the alkylene oxide addition products of polyhydric alcohols such as ethylene glycol, propylene glycol, dipropylene glycol, trimethylene glycol, 1,2-butanediol, 1,5-pentanediol, 1,6-hexanediol, 1,7-heptanediol, hydroquinone, resorcinol, glycerol, 1,1,1-trimethylolpropane, 1,1,1-trimethylolethane, pentaerythritol, 1,2,6-hexanetriol, alpha-methyl glucoside, sucrose, sorbitol, and mixtures thereof.

The polyester polyol can be selected from the group consisting of polyethylene glycol butyrate, polyethylene glycol glutarate, polyethylene glycol adipate, polypropylene glycol butyrate, polypropylene glycol glutarate, polypropylene glycol adipate, polycaprolactonediol, polyhexamethylene adipate, polyhexamethylene sebacate, polyhexamethylene dodecanate, poly(ethylene adipate), polybutylene adipate, polyester polyol from isophthalic acid and diethylene glycol (IPA-DEG polyol), polyester polyol from isophthalic acid, diethylene glycol, 2-methyl-1,3-propanediol (IPA-DEG-MPD polyol), polyester polyol from terephthalic acid and diethylene glycol (TPA-DEG polyol), polyester polyol from terephthalic acid, diethylene glycol, and 2-methyl-1,3-propanediol (TPA-DEG-MPD), and mixtures thereof.

In embodiments, the polymeric polyol has a molecular weight (M w) of 0.5-30, or 0.6-25, or 0.7-22, or 0.8-20, or 0.9-18, or 1-15, or 0.5-5, or 1-5 kg/mol.

In embodiments, the hydroxyl group containing compound is added in amounts of 3-50, or 5-40, or 5-30, or 3-25, or 5-20 wt. %, based on total weight of the curable polymer composition.

(Optional Additives)

In embodiments, the curable polymer composition further comprises at least one additive selected from the group consisting of initiators, cross-linking agents, activators, curing agents, stabilizers, neutralizing agents, thickeners, coalescing agents, slip agents, release agents, anti-microbial agents, surfactants, antioxidants, antiozonants, color change pH indicators, plasticizers, tackifiers, film forming additives, dyes, pigments, UV stabilizers, UV absorbers, catalysts, fillers, other resins, redox couples, fibers, flame retardants, viscosity modifiers, wetting agents, deaerators, toughening agents, adhesion promoters, colorants, heat stabilizers, light stabilizers, lubricants, drip retardants, anti-blocking agents, anti-static agents, processing aids, stress-relief additives, and mixtures thereof.

Examples of fillers include carbon black, silica, calcium carbonate, carbon nanotube, clay, mica, silicates, talc, titanium dioxide, alumina, aluminum hydroxide, aluminum oxide, zinc oxide, starch, wood flour, and mixtures thereof. The filler can be surface treated with commonly known surface treating agents, e.g., alkoxysilanes.

In embodiments, amounts of additives added in the range of 1-30, or 1-20, or 5-15, or 1-10, or 1-5 wt. %, based on total weight of the curable polymer composition.

In embodiments, the curable polymer composition further includes polymers other than the SSBC, e.g., polytetrafluoroethylenes (PTFEs), polyolefins, polyimides, polyamides, polyesters, polystyrenes, polysulfones, polyketones, polyphenylene ethers, polyisoprenes, polybutadienes, polyvinylidene fluorides, polycarbonates, polyetherimides, ethylene-vinyl alcohol copolymers, polyvinylidene chlorides, polyacrylates, polytertbutylstyrene, and mixtures thereof, in an amount of 1-30, or 2-25, or 5-20 wt. %, based on total weight of the curable polymer composition.

(Methods of Preparation of Curable Polymer Compositions)

In embodiments, the curable polymer composition comprises: (a) 3-50 wt. % of at least one hydroxyl group containing compound selected from the group consisting of diols, triols, tetraols, polyols, polymeric polyols, and mixtures thereof; and (b) 50-97 wt. % of a SSBC, based on total weight of the curable polymer composition. The curable polymer composition can be prepared by mixing the components, e.g., SSBC and at least one hydroxyl group containing compound, in a solvent or a mixture of solvents to obtain a dispersion or solution. Examples of solvents include cyclopentane, cyclohexane, cycloheptane, cyclooctane, hexane, heptane, nonane, decane, paraffinic oil, methanol, ethanol, methyl-tert-butyl ether, tetrahydrofuran (THF), dioxan, ethyl acetate, dimethylsulfoxide (DMSO), dimethylformamide (DMF), methanol, ethanol, propanol, butanol, toluene, xylene, and mixtures thereof.

In embodiments, the curable polymer composition is prepared by adding the components to a mixture of solvents, e.g., toluene:1-propanol, cyclohexane:heptane, or cyclohexane:1-propanol. The mixture of solvents can have two solvents in a weight ratio of 1:10 to 10:1, or 1:8 to 8:1, or 1:6 to 6:6, or 1:2 to 2:1 or 1:1. The concentration of the curable polymer composition in the solvent(s) can be from 2-30%, or 5-20%, or >2%, or >5%, or >10%, or >15%, based on total weight of the dispersion/solution.

In embodiments, the dispersion/solution is subjected to heating at a temperature of 20° C. to the boiling point of the employed solvent(s), or 20-100° C., or 25-95° C., or 30-90°

C., or 35-85° C., or >35° C., or <80° C., and for sufficient time in the range of 1 minute-24 hours, or 5 minute-2 hours, or 10 minute-1 hour, or 20 minute-40 minute, or >5 minute, or <1 hour, with or without agitation, to obtain a homogenous dispersion/solution.

In embodiments, all components of the composition individually or more than one, are separately mixed in the solvent(s) and mixtures of such dispersions/solutions are finally combined to obtain the composition. After the composition is prepared, depending on the end-use applications, it can be made into articles, e.g., films or membranes, before curing.

In embodiments, a film is prepared from the curable polymer composition by any of casting, electrospinning, extrusion, compression, coating, such as dipping, flow coating, roll coating, bar coating, spray coating, curtain, rotogravure, brushing, wire wound rod coating, pan fed reverse roll coating, nip-fed coating, spraying, knife coating, spin coating, immersion coating, slot-die coating, ultrasonic spray coating, and the like. The film can be stand-alone or supported on a substrate, e.g., glass, plastic, ceramic, porcelain, etc.

In embodiments, a SSBC film is obtained by mixing the solvent(s) mentioned above and the SSBC. The SSBC film is then soaked in a polymeric polyol solution at a temperature ranging from room temperature to 95° C., or 30-90° C., or 40-80° C., or 50-70° C., or 30-70° C., or 40-75° C., for a period of 30 minutes-48 hours, or 1 hour-40 hours, or 2 hours-30 hours, or 5 hours-25 hours, or >2 hours or >5 hours, or >10 hours or >15 hours. After soaking, the film is dried at ambient or up to 80° C., or 30-70° C., or 35-65° C., with or without vacuum for a period of 1 hour-7 days, or 5 hours-5 days, or 10 hours-2 days. The polymeric polyol solution is prepared from a diluent, e.g., organic solvents or water, in a concentration ranging from 1-50%, or 2-45%, or 5-40%, or 1-20%, based on total weight of the solution.

(Cured Compositions/Articles)

In embodiments, after an article is formed from the curable polymer composition, the article is cured by radiation or thermal energy. Curing can be done by any of heat, UV radiation, gamma radiation, electron-beam (E-beam), or in microwave, in the presence or absence of a thermal/photo initiator. Curing can result in cross-linking of components of the curable polymer composition.

In embodiments, curing is conducted at 70-200° C., or 90-180° C., or 100-160° C. for 10 minutes-24 hours, or 30 minutes-20 hours, or 1 hour-18 hours.

In embodiments, the cured article is a film or a membrane having a thickness of 1-400 μm, or 2-200 μm, or 5-100 μm, or 10-50 μm, or >2 μm, or <40 μm.

In embodiments, the cured film is heat laminated, solvent laminated, or adhesive laminated onto a microporous support substrate for use in the water purification system. Examples of the microporous support substrate include polyester, polyethylene, polypropylene, polyethylene terephthalate, cellulose, cellulose nitrate, cellulose acetate, nylon, polytetrafluoroethylene, a fibrous woven or a nonwoven material, and the like. Alternatively, the cured film can be supported onto commercially available membranes. The film can be deposited on one or all surfaces of the substrate.

(Properties of Articles Comprising Cured Compositions)

The cured composition is elastic and has a good balance of low swell and high water vapor transmission rate (WVTR), dimensionally stable in the presence of water and has strength in wet and dry state, good water and ion transport characteristics, methanol resistance, barrier properties, controlled flexibility, adjustable hardness, thermal/oxidative stability, has anti-microbial and anti-fouling properties, possesses improved electrical properties such as high dielectric constant, low tangent loss angles, high breakdown voltages, and high bulk resistance. The cured composition has sufficient flexibility such that a film formed therefrom can be rolled, screwed in both dry and wet conditions, cut, and meshed without breaking or deforming.

Mechanical properties can be measured per ASTM D412.

In embodiments, the cured composition has a tensile stress in dry state of 6.2-30, or 7-25, or 8-20, or 10-17 MPa, and a tensile stress in wet state measured after 1 day, of 3.0-10, or 3.5-9, or 4-8 MPa. The cured composition is characterized as remaining relatively stable, with tensile strength relatively unchanged after 1 week, for a tensile stress in wet state after 1 week of 3.0-10, or 3.5-9, or 4-8 MPa.

In embodiments, the cured composition has a toughness in dry state of 3-25, or 4-22, or 5-20, or 6-18 $MJ/m^3$, and a toughness in wet state measured after 1 day, of 1.5-10, or 1.8-9, or 2-8 $MJ/m^3$. The toughness goes down slightly after being in wet state for 1 week, of 1.2-8, or 1.4-7.5, or 1.5-7 $MJ/m^3$.

In embodiments, the cured composition has a Young's modulus in dry state of 190-700, or 200-680, or 300-670, or 400-700 MPa, and a Young's modulus in wet state measured after 1 day, of 6.5-100, or 10-95, or 20-90, or 40-90 MPa. In embodiments, the cured composition has a Young's modulus in wet state measured after 1 week, of 6.5-100, or 10-95, or 30-95, or 40-95 MPa.

In embodiments, the cured composition has an elongation at break in dry state of 75-250%, or 76-220%, or 78-180%, and an elongation at break in wet state measured after 1 day, of 83-200%, or 85-180%, or 88-170%. In embodiments, the cured composition has an elongation at break in wet state measured after 1 week, of 58-150%, or 60-145%, or 62-140%.

In embodiments, the cured composition has a storage modulus (E) for a temperature ranging from −80 to 200° C. of 100-4000, or 150-3500, or 200-3200 MPa, measured by dynamic mechanical analysis (DMA).

In embodiments, the cured composition has a Gel Content of >70%, or >75%, or >80%, or 70-95%, or 75-90%.

In embodiments, the cured composition has a Weight Gain after 1 week at room temperature of 15-100, or 18-90, or 20-80, or <80, or <75 wt. %.

In embodiments, the cured composition has a Weight Gain after 1 week at 80° C. of 150-300, or 155-290, or 160-280, or 165-275, or <290, or <280, or <275 wt. %.

In embodiments, the cured composition shows little variations in Weight Gain, e.g., a Weight Gain increases at room temperature from 1 week to 4 weeks of <50%, or <25%, or <20%.

In embodiments, the cured composition has an IEC of 0.7-2.5, or 0.8-2.4, or 1.0-2.3, or 1.1-2.2, or 0.8-2.10, or >0.7, or <2.3 meq/g.

In embodiments, the cured composition has a water vapor transfer rate (WVTR) measured according to ASTM E96 in an upright or upside down manner at 50° C. and at 10% of relative humidity. In embodiments, the WVTR in an upright manner is 6000-9900, or 6500-9800, or 7000-9700, or 7500-9600, or 8000-9500 $g/m^2$/day. In embodiments, the WVTR in an upside down manner is 50000-150000, or 60000-140000, or 65000-120000, or 70000-110000 $g/m^2$/day.

In embodiments, a proton conductivity is measured using four probe electrochemical impedance spectroscopy on a film of the cured composition. The cured composition has a proton conductivity at 25° C. of 100-180, or 110-170, or 115-160, or 110-150 mS/cm. In embodiments, the cured composition has a proton conductivity at 60° C. of 180-280, or 190-270, or 200-260, or 190-260 mS/cm. In embodiments, the cured composition has a proton conductivity at 80° C. of 250-350, or 260-340, or 270-330, or 280-320 mS/cm.

(Applications)

The cured composition can be made into articles by commonly known processes, e.g., injection blow molding, injection molding, extrusion blow molding, coextrusion molding, cast film extrusion, blown film extrusion, injection stretch blow molding (ISBM), rotational molding, thermoforming, thermofusion, foam blow molding, pultrusion, calendaring, or additive manufacturing.

In embodiments, the cured composition is made into films or membranes, for use in applications including energy storage applications, electrical capacitors, super capacitors, membranes, coatings for cleanroom workwear and numerous medical applications such as wound dressings, surgeons' gowns, drapes and other biologically protective garments or barrier covers where moisture-vapor permeability is useful, and elasticity is desirable.

A cured film can be a microfiltration membrane, an ultrafiltration membrane, a nanofiltration membrane, or a reverse osmosis membrane. The cured film can be used in fuel cell (separator phase), proton exchange membranes for fuel cells, battery, or device for energy storage, membrane capacitive deionization (MCDI), ion exchange membranes (anion and/or cation), harvesting, or recovery, for reverse or forward electrodialysis, for controlling humidity, separation cell (electrolyte barrier) for metal recovery processes, forward or reverse osmosis, for electro- or capacitive deionization, or for purifying or detoxifying gases or liquids, for wastewater treatment, air condition (AC) dehumidification, as electrolyzer membranes, or food storage.

In embodiments, the cured film is used in a flow battery for an electric storage device or an electric storage system for conducting ions, such as, for example, lithium ion, sodium ion, and the like. The cured film when used in a flow battery has low swelling property when in contact with a non-aqueous liquid and can provide high ion exchange capacity.

In embodiments, the cured film when used as the water purification membrane, helps in removing metals, e.g., copper, chromium, and the like from target water stream. "Water" refers to deionized water, tap water, distilled water, process water, or natural water, spring water, mineral water, sparkling water, hard water, or mixtures thereof.

EXAMPLES

The following examples are intended to be non-limiting.

The viscoelastic behavior is measured by DMA according to ASTM 4065.

Mechanical properties, including toughness, Young's modulus, tensile strength, and elongation at break, in the dry and wet states are measured according to ASTM D412. For mechanical property measurements in the wet state, samples were equilibrated under water for a suitable period prior to test.

Storage modulus of cured film samples is measured by dynamic mechanical analysis (DMA) at 11 Hz from −80° C. to +180° C. with ramp of 2° C./min, oscillation strain was 0.1%, in tensile mode.

Proton conductivity measurements are performed by using potentiostat/galvanostat and an impedance analyzer inside the DI water environment via electrochemical impedance spectroscopy (EIS). Impedance scans (Nyquist plots) are measured with open-circuit potential at a 10 mV amplitude over a frequency range from 1 MHz to 1 Hz at a temperature range from 25 to 80° C. Cured film (thickness of 50 μm) samples are equilibrated for at least 1 hour at each temperature followed by five measurements at the equilibrium condition. Proton conductivity is calculated using the following equation (I):

$$\sigma = L/AR \tag{I}$$

where L and A are the thickness and cross-section area of the sample, respectively, and the resistance R is determined from the equivalent circuit regression from the Nyquist plot.

The components used in examples include:

SSBC-1: A sulfonated penta block copolymer of the structure poly[tert-butylstyrene-b-(ethylene-alt-propylene)-b-(styrene-co-styrene-isulfonate)-b-(ethylene-alt-propylene)-tert-butylstyrene](tBS-EP-sPS-EP-tBS) with 52% sulfonation. The tBS block has a $M_p$ of about 15 kg/mol, the EP blocks each has a $M_p$ of about 12 kg/mol, and the interior sPS block has a $M_p$ of about 22 kg/mol.

Polymeric polyol-1 (PyP-1) is a polyethylene glycol having molecular formula of $(C_2H_4O)_nH_2O$, CAS No. 25322-68-3EC, and molecular weight (M w) of 1000 g/mol.

Example 1

SSBC-1 (95 wt. %) and PyP-1 (5 wt. %) were mixed in toluene:1-propanol mixture (1:1) to yield a 20 wt. % concentrated dispersion and left overnight to achieve complete dissolution. Film samples of 50 μm (2 mil) thickness each were prepared from the solution by automatic film applicator. Films were cured at 130° C. for different periods.

Example 2

Example 1 was repeated with 90 wt. % of the SSBC-1 and 10 wt. % PyP-1.

Example 3

Example 1 was repeated with 85 wt. % of the SSBC-1 and 15 wt. % PyP-1.

Example 4

Example 1 was repeated by replacing polymeric polyol with 5 wt. % glycerol. Thickness of film sample was about 50 μm (2 mil) and thermal curing was conducted at 130° C. for different periods.

Polymer compositions and curing details are provided in Table 1.

Table 1

| Examples | SSBC-1 (wt. %) | PyP-1 (wt. %) | Curing Temp. (° C.) | Curing Time (hrs.) |
|---|---|---|---|---|
| SSBC-1 | 100 | — | — | — |
| Example 1a | 95 | 5 | 130 | 1 |
| Example 1b | 95 | 5 | 130 | 4 |
| Example 1c | 95 | 5 | 130 | 8 |

-continued

| Examples | SSBC-1 (wt. %) | PyP-1 (wt. %) | Curing Temp. (° C.) | Curing Time (hrs.) |
|---|---|---|---|---|
| Example 2a | 90 | 10 | 130 | 1 |
| Example 2b | 90 | 10 | 130 | 4 |
| Example 2c | 90 | 10 | 130 | 8 |
| Example 2d | 90 | 10 | 130 | 12 |
| Example 3a | 85 | 15 | 130 | 1 |
| Example 3b | 85 | 15 | 130 | 4 |
| Example 3c | 85 | 15 | 130 | 8 |
| | | Glycerol (wt. %) | | |
| Example 4a | 95 | 5 | 130 | 1 hr. |
| Example 4b | 95 | 5 | 130 | 30 min. |

Mechanical and WVTR properties of films obtained from examples 1 to 4 are shown in tables 2, 3, 4, and 5. Table 6 shows Gel Content of cured films and Tables 7 and 8 present the weight gain of cured films. Proton conductivity of cured films were measured and presented in table 9.

TABLE 2

| | DRY STATE | | | |
|---|---|---|---|---|
| Examples | Toughness ($MJ/m^3$) | Elongation at break (%) | Tensile Stress (MPa) | Young's Modulus (MPa) |
| SSBC-1 | 2.8 | 72.2 | 6.1 | 189 |
| Example la | 10.8 | 111 | 12.5 | 579.3 |
| Example 1b | 8.2 | 70.1 | 13.8 | 642.2 |
| Example 1c | 9.3 | 88.7 | 12.7 | 669.9 |
| Example 2a | 12.9 | 113.9 | 14.7 | 566.7 |
| Example 2b | 10 | 92.1 | 13 | 596.7 |
| Example 2c | 7.1 | 74.6 | 11.2 | 611 |
| Example 2d | 8.3 | 89.9 | 11.1 | 558.9 |
| Example 3a | 10.2 | 95.1 | 13.4 | 650.4 |
| Example 3b | 10.4 | 89.5 | 14.3 | 651.7 |
| Example 3c | 9.1 | 79.6 | 13.4 | 607.9 |
| Example 4a | 12.4 | 97.7 | 15.7 | 623.2 |

TABLE 3

| | Wet state (after 1 day) | | | |
|---|---|---|---|---|
| Examples | Toughness ($MJ/m^3$) | Elongation at break (%) | Tensile Stress (MPa) | Young's Modulus (MPa) |
| SSBC-1 | 1.4 | 82.8 | 2.8 | 6 |
| Example 1a | 5.4 | 111.8 | 7.6 | 44.5 |
| Example 1b | 3.9 | 91.1 | 6.3 | 60.6 |
| Example 1c | 3 | 77.3 | 5.5 | 64.9 |
| Example 2a | 2.4 | 63.6 | 5 | 64 |
| Example 2b | 4.5 | 95.8 | 6.6 | 67 |
| Example 2c | 3 | 72.2 | 5.7 | 46.3 |
| Example 2d | 3.4 | 71.5 | 6.4 | 74.6 |
| Example 3a | 2.6 | 65.5 | 5.6 | 68.9 |
| Example 3b | 2.7 | 65.7 | 5.6 | 87.8 |
| Example 3c | 3.1 | 70.1 | 6.5 | 67.8 |
| Example 4a | 4.8 | 107.1 | 6.8 | 52.2 |

TABLE 4

| | Wet state (after 1 week) | | | |
|---|---|---|---|---|
| Examples | Toughness ($MJ/m^3$) | Elongation at break (%) | Tensile Stress (MPa) | Young's Modulus (MPa) |
| SSBC-1 | 1.4 | 82.8 | 2.8 | 6 |
| Example 1a | 5.5 | 120.2 | 7.3 | 62.4 |
| Example 1b | 3 | 73.9 | 5.5 | 82.6 |
| Example 1c | 3.2 | 76.5 | 5.6 | 84.4 |
| Example 2a | 2.8 | 71.3 | 5.2 | 61.7 |
| Example 2b | 3.1 | 73.4 | 5.4 | 76.5 |
| Example 2c | 1.7 | 45.3 | 4.8 | 51.8 |
| Example 2d | 3.8 | 77.4 | 6.8 | 75.4 |
| Example 3a | 2.4 | 57.1 | 5.5 | 77 |
| Example 3b | 2.3 | 59.1 | 5.1 | 93.4 |
| Example 3c | 3.1 | 74.3 | 6.4 | 69 |
| Example 4a | 4.2 | 97.7 | 6.1 | 72.2 |

TABLE 5

| | WVTR Data (at 50° C. and 10% Relative Humidity) | | | |
|---|---|---|---|---|
| Examples | Upright | Comparison with SSBC-1 (%) | Upside down | Comparison with SSBC-1 (%) |
| SSBC-1 | 10000 | — | 101303 | — |
| Example 1a | 9157 | 92 | 91777 | 91 |
| Example 1b | 9045 | 90 | 91899 | 91 |
| Example 1c | 8805 | 88 | 87743 | 87 |
| Example 2a | 8882 | 89 | 103886 | 103 |
| Example 2b | 8536 | 85 | 104335 | 103 |
| Example 2c | 8726 | 87 | 111454 | 110 |
| Example 2d | 8805 | 88 | 88350 | 87 |
| Example 3a | 9147 | 91 | 92721 | 92 |
| Example 3b | 9195 | 92 | 93086 | 92 |
| Example 3c | 9068 | 91 | 89667 | 89 |
| Example 4a | 9028 | 90 | 73666 | 73 |

TABLE 6

| Examples | Curing temp. (° C.) | Curing time (hrs.) | Gel Content (%) |
|---|---|---|---|
| SSBC-1 | 130 | 1 | 5.4 |
| Example 1a | 130 | 1 | 80.4 |
| Example 1b | 130 | 4 | 85.2 |
| Example 1c | 130 | 8 | 86.8 |
| Example 1d | 130 | 30 | 80.8 |
| Example 4a | 130 | 1 | 86.2 |
| Example 4b | 130 | 30 min. | 84.7 |

TABLE 7

| Examples | Curing temp. (° C.) | Curing time (hrs.) | Swelling time in DI water at 80° C. | Weight gain (wt. %) |
|---|---|---|---|---|
| SSBC-1 | not cured | not cured | 24 hours | 356 |
| | | | 1 week | 418 |
| | | | 2 weeks | Fail |

TABLE 7-continued

| Examples | Curing temp. (° C.) | Curing time (hrs.) | Swelling time in DI water at 80° C. | Weight gain (wt. %) |
|---|---|---|---|---|
| SSBC-1 | 130 | 1 | 24 hours | 302 |
| | | | 1 week | 306 |
| | | | 2 weeks | 247 |
| | | | 3 weeks | Fail |
| Example 1a | 130 | 1 | 24 hours | 94 |
| | | | 1 week | 171 |
| | | | 2 weeks | 173 |
| | | | 3 weeks | 182 |
| | | | 4 weeks | 171 |
| Example 4a | 130 | 1 | 24 hours | 194 |
| | | | 1 week | 273 |
| | | | 2 weeks | 191 |
| | | | 3 weeks | 264 |
| | | | 4 weeks | 243 |

TABLE 8

| Examples | Curing temp. (° C.) | Curing time (hrs.) | Swelling time in DI water at room temperature | Weight gain (wt. %) |
|---|---|---|---|---|
| SSBC-1 | not cured | not cured | 24 hours | 139 |
| | | | 1 week | 157 |
| | | | 4 weeks | 159 |
| SSBC-1 | 130 | 1 | 24 hours | 138 |
| | | | 1 week | 143 |
| | | | 2 weeks | 112 |
| | | | 3 weeks | 131 |
| Example 1a | 130 | 1 | 24 hours | 21 |
| | | | 1 week | 26 |
| | | | 2 weeks | 29 |
| | | | 3 weeks | 44 |
| | | | 4 weeks | 40 |
| Example 4a | 130 | 1 | 24 hours | 601 |
| | | | 1 week | 73 |
| | | | 2 weeks | 70 |
| | | | 3 weeks | 73 |
| | | | 4 weeks | 76 |

TABLE 9

| Examples | Curing temp. (° C.) | Curing time (hrs.) | Proton conductivity ($H^+$) (mS/cm) in DI water σ (25° C.) | σ (60° C.) | σ (80° C.) |
|---|---|---|---|---|---|
| SSBC-1 | — | — | 151.9 | 205.0 | 63.8 |
| SSBC-1 | — | — | 117.3 | 158.9 | 129.1 |
| SSBC-1 | 130 | 1 | 148.3 | 194.0 | 187.5 |
| Example 1a | 130 | 1 | 126.7 | 223.3 | 287.0 |
| Example 1b | 130 | 4 | 142.1 | 245.5 | 310.0 |
| Example 4a | 130 | 1 | 120.8 | 215.6 | 268.3 |
| Example 4b | 130 | 30 min. | 121.1 | 208.0 | 289.0 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "includes" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A cured composition obtained by curing a curable polymer composition comprising:

(a) 3 to 50 wt. % of at least one hydroxyl group containing compound selected from: (i) diols, triols, tetraols, and polyols, each having a molar mass of less than 0.5 kg/mol, (ii) polymeric polyols; and (iii) mixtures thereof;

(b) 50 to 97 wt. % of a sulfonated block copolymer comprising a block A, a block B, and a block D, wherein:

each block A is a polymer block resistant to sulfonation and selected from polymerized: (i) para-substituted styrene monomers, (ii) ethylene, (iii) alpha olefins of 3 to 18 carbon atoms, (iv) 1,3-cyclodiene monomers, (v) monomers of conjugated dienes having a vinyl content less than 35 mole % prior to hydrogenation, (vi) acrylic esters, (vii) methacrylic esters, and (viii) mixtures thereof, each block B is a polymer block susceptible to sulfonation and derived from a vinyl aromatic monomer, wherein the block B has a degree of sulfonation of >10 mole %, and each block D is a polymer block resistant to sulfonation and derived from a conjugated diene monomer;

wherein the weight percentages of components (a) and (b) are based on the total weight of the curable polymer composition; and wherein the cured composition is characterized as having:

a tensile stress per ASTM D412 of:

6.2 to 30 MPa in a dry state, and 3 to 10 MPa in a wet state after 1 day, both measured as described in the specification; and a Gel Content of >70%, measured according to Gel Content Test as described in the specification.

2. The cured composition of claim 1, wherein the at least one hydroxyl group containing compound is a polymeric polyol having a weight average molecular weight ($M_w$) of 0.5 to 30 kg/mol and selected from the group consisting of polyether polyol, polyester polyol, polyester-polyether polyol, polycarbonate polyol, polycaprolactone polyol, acrylic polyol, polyether polycarbonate polyol, and mixtures thereof.

3. The cured composition of claim 1, wherein the at least one hydroxyl group containing compound is a polymeric polyol having a weight average molecular weight ($M_w$) of 0.7 to 22 kg/mol.

4. The cured composition of claim 1, wherein the at least one hydroxyl group containing compound is a polyether polyol.

5. The cured composition of claim 1, wherein the at least one hydroxyl group containing compound is selected from the group consisting of diol, triol, tetraol, and polyol, and wherein each diol, triol, tetraol, and polyol independently has a molar mass of 0.05 to 0.45 kg/mol.

6. The cured composition of claim 1, wherein the at least one hydroxyl group containing compound is glycerol.

7. The cured composition of claim 1, wherein the cured composition has a tensile stress in wet state, after 1 week, of 3.0 to 10 MPa.

8. The cured composition of claim 1, wherein the cured composition has at least one of:

a toughness in dry state of 3 to 25 $MJ/m^3$;

a Young's modulus in dry state of 190 to 700 MPa; and an elongation at break in dry state of 75 to 250%, all properties measured according to ASTM D412.

9. The cured composition of claim 1, wherein the cured composition has at least one of:

a toughness in wet state, after 1 week, of 1.2 to 8 $MJ/m^3$;

a Young's modulus in wet state, after 1 week, of 6.5 to 110 MPa; and an elongation at break in wet state, after 1 week, of 58 to 150%, all properties measured according to ASTM D412.

10. The cured composition of claim 1, wherein the cured composition has at least one of:

a water vapor transmission rate (WVTR) in an upright manner of 6000 to 9900 $g/m^2$/day; and a water vapor transmission rate (WVTR) in an upside down manner of 50000 to 150000 $g/m^2$/day, both measured according to ASTM E96.

11. The cured composition of claim 1, wherein the cured composition has a Gel Content of >80%.

12. The cured composition of claim 1, wherein the cured composition has a Weight Gain of:

15 to 100% after 1 week at room temperature; and 150 to 300% after 1 week at 80° C.

13. The cured composition of claim 1, wherein the cured composition has an ion exchange capacity of 0.7 to 2.5 meq/g.

14. The cured composition of claim 1, wherein the sulfonated block copolymer has an ion exchange capacity of 0.5 to 2.6 meq/g.

15. The cured composition of claim 1, wherein the cured composition has a proton conductivity:

at 25° C. of 100 to 180 mS/cm;

at 60° C. of 180 to 280 mS/cm; and at 80° C. of 250 to 350 mS/cm.

16. The cured composition of claim 1, wherein the sulfonated block copolymer is obtained by sulfonation of a styrenic block copolymer precursor having a general configuration of: A-B-A, $(A\text{-}B)_n(A)$, $(A\text{-}B\text{-}A)_n$, $(A\text{-}B\text{-}A)_nX$, $(A\text{-}B)_nX$, A-D-B, A-B-D, A-D-B-D-A, A-B-D-B-A, $(A\text{-}D\text{-}B)_nA$, $(A\text{-}B\text{-}D)_nA$ $(A\text{-}D\text{-}B)_nX$, $(A\text{-}B\text{-}D)_nX$, $(A\text{-}D\text{-}B\text{-}D\text{-}A)_nX$, $(A\text{-}B\text{-}D\text{-}B\text{-}A)_nX$, or mixtures thereof; wherein n is an integer from 2 to 30; and X is a residue of a coupling agent.

17. The cured composition of claim 1 obtained by curing the curable polymer composition at 70 to 200° C.

18. The cured composition of claim 1, wherein the curable polymer composition comprises:

(a) 5 to 30 wt. % of at least one hydroxyl group containing compound selected from diols, triols, tetraols, polyols, polymeric polyols, and mixtures thereof; and (b) 70 to 95 wt. % of the sulfonated block copolymer, based on total weight of the cured composition.

19. A membrane comprising the cured composition of claim 1.

* * * * *